Dec. 7, 1954   J. S. McCALL   2,696,195
ANIMAL MUZZLE
Filed Nov. 13, 1953

INVENTOR
John S. McCall
BY Cushman, Darby & Cushman
ATTORNEYS

United States Patent Office 2,696,195
Patented Dec. 7, 1954

2,696,195

ANIMAL MUZZLE

John S. McCall, Santa Barbara, Calif.

Application November 13, 1953, Serial No. 391,796

3 Claims. (Cl. 119—133)

This invention relates to animal muzzles, and particularly to muzzles adapted for application to small animals such as chinchillas.

Female chinchillas are prone to fight their mates during the mating and breeding season, with the result that every season many males are killed, or have their coats severly damaged. The females too are often injured, and the resultant economic loss to the industry is considerable.

Muzzling the animals has been suggested, but hitherto has not been successful or widely practiced. The difficulties involved in muzzling chinchillas are evident. Heavy or bulky muzzles may not be used, and a muzzle acceptable for industry adoption must be strong, light, easily and quickly applicable, and particularly designed to preclude any possibility of injury or damage to the animals.

It is an object of the present invention, accordingly, to provide an extremely light, strong, all-metal muzzle suitable for application to chinchillas. A related object is to provide a flexible, pliable and adjustable muzzle, having no hinges or loose joints, suitable for application to small, delicate animals.

A further object of the invention is to provide an all-metal muzzle adapted for assembly by electric welding, and so constructed that all inside surfaces thereof are flat and smooth.

Another object is to provide a small animal muzzle which may be readily and quickly applied, without undue excitation of the animal.

Still another object of the invention is to provide a sanitary and corrosion resistant muzzle for small animals, of sturdy and durable construction, adapted to stand up under repeated use, and even sterilization when necessary. Further objects will be in part evident and in part pointed out hereinafter.

The invention and the advantages thereof may best be made clear by reference to the following description and the accompanying drawings, in which.

Figure 1:
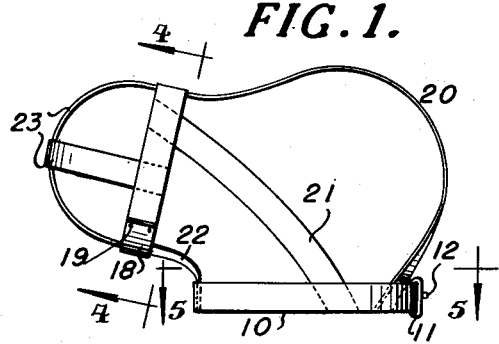
Figure 1 is a side elevational view of a preferred embodiment of the invention.

Referring to the drawings, the muzzle of the present invention in preferred embodiment is constructed of thin, flat, flexible metal straps, desirably of stainless steel, stock .220 inch in width and .006 inch thick being entirely suitable. The basic element of the device is a collar band 10, detachably and adjustably closed at the rear thereof by suitable fastening means, such as the common buckle 11. For adjustable closing, as will be readily understood, the buckle tongue 12 may engage any one of a series of apertures 13 in the end portion 14 of the collar band, and if desired a retaining loop 15 may be provided to hold the overlapping end portion of the collar band close to the body portion thereof.

Figure 2:
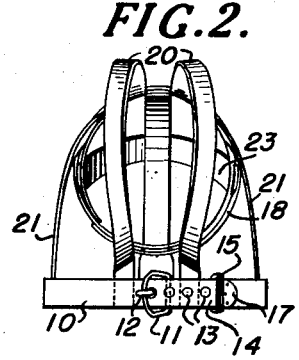
Figure 2 is an end elevational view of the device of Figure 1, viewed from the right-hand side thereof.

The collar band may be constructed of the stock described, but preferably is formed of a double layer of the stock. This is advantageous because its end portion must withstand considerable flexing and the wear of the buckle tongue, and for further reasons presently apparent. The double layer is most conveniently fabricated from a single length, doubled on itself to form an end loop 16, which may then enclose and retain the buckle 11. To prevent separation of the layers of end portion 14, the free ends of the two layers may be joined by electrical welding, preferably by spot welding, as indicated at 17 in Figure 2.

Figure 4:
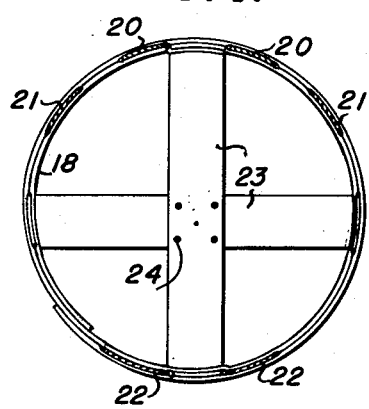
Figure 4 is a sectional view, somewhat enlarged, taken on the line 4—4 of Figure 1.
Figure 5:
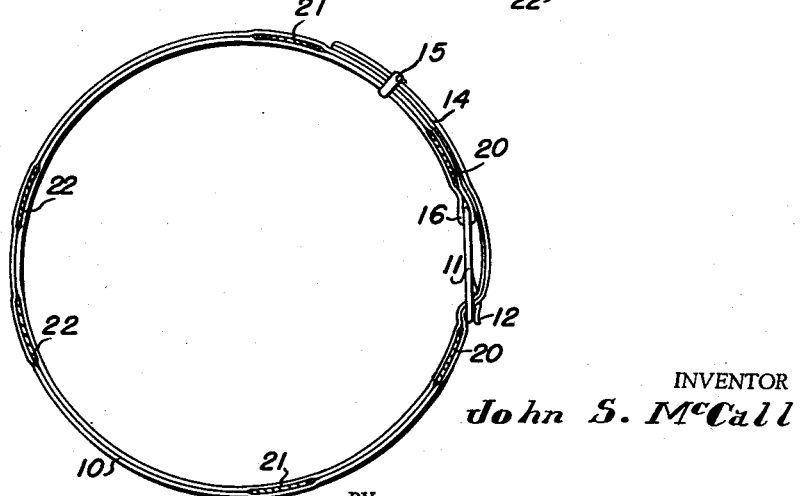
Figure 5 is a sectional view, also somewhat enlarged, taken on the line 5—5 of Figure 1.

Slightly offset from the collar band and acutely angulated with respect thereto is a nose band 18, which also may advantageously be constructed of a double layer of stock. As illustrated in Figure 4, the nose band may most conveniently be formed of a single length of stock, coiled double and tacked at 19 by spot welding.

Between the collar band and the nose band extend a plurality of straps, of suitable length to properly align the bands with respect to each other and define therebetween a shape corresponding generally to the head of the animal to be muzzled. Preferably, two head straps 20 extend from the upper portion of the nose band to the rear side of the collar band, a pair of cheek straps 21 extend from the upper sides of the nose band to the rear sides of the collar band, and a third pair of chin straps 22 extend from the underside of the nose band to the front of the collar band. The relative length and configuration of the straps are illustrated in the drawings. An examplary set of dimensions suitable to effect the desired overall shape appears below:

Collar band _____ 6¼ inches.
Nose band _____ 4 inches (circumference).
Head straps _____ 3¾ inches.
Cheek straps _____ 2¼ inches.
Chin straps _____ 1 inch.

As will be evident, the flat stock is so assembled that flat surfaces only are presented to the head of the muzzled animal. To avoid any projections, joints, hinges or rough areas which might irritate or injure the animals, the several straps are attached to the collar band and nose band preferably by spot welding. In the illustrated embodiment, wherein the collar band and nose band are double layered, the straps may be welded between the layers of the band. This configuration effects maximum smoothness and regularity along the surfaces in contact with the animal's head, and is a further advantageous aspect of the double layered bands.

A pair of nose loops 23 may extend forwardly from the nose band, preferably disposed at right angles to each other and joined to the nose band in the same manner as are the straps. As illustrated in Figure 4, the nose loop ends may enter between the layers of the nose band at positions offset from the ends of the straps, so that overlapping is entirely avoided. To prevent inadvertent displacement of the nose loops, and to suitably stiffen the structure to prevent possible injury thereby, they are desirably joined at their intersection by spot welds, as illustrated at 24 in Figure 4. In a muzzle of the specific dimensions listed above, the nose loops may suitably be 2⁵⁄₁₆ inches in length.

In order that the interior surfaces of the muzzle may be as smooth as possible, these surfaces may be highly polished. If the muzzle is constructed of stainless steel having one side polished, it should be so assembled that the polished surfaces are in all cases disposed inwardly. As will be evident, the assembled muzzle is of the lightest possible construction, a muzzle of the dimensions and material described weighing less than ¼ ounce.

Figure 3:
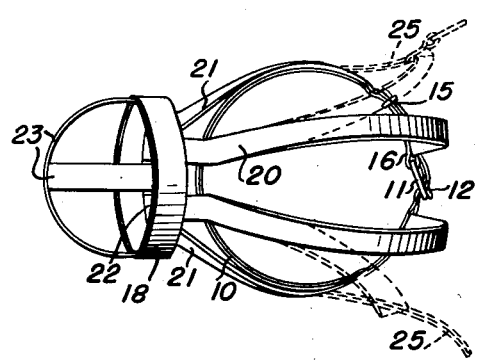
Figure 3 is a top plan view of the device of Figure 1, illustrating the open and spread configuration thereof in dotted lines.

Utilization of the device will be apparent from the foregoing description and the accompanying drawings. To apply the muzzle to a chinchilla, for example, the flexible and pliable collar band may be opened by means of buckle 11, and the rear portion of the muzzle may be laterally spread as illustrated by the dotted lines 25 in Figure 3. Spreading of the rear ends of the collar band effects also lateral spreading of the rear portions of the head straps 20 and cheek straps 21. So held and spread, the muzzle may be readily placed over the head of the animal, and secured merely by buckling the collar band, selecting a buckle tongue aperture 13 suitable for the size of the animal's head and neck. This operation, obviously, may be performed very quickly, and the muzzle may be as readily removed. Once in place, even with the collar band comfortably loose, the muzzle cannot be dislodged except by intentional unbuckling, and due to its metal construction it cannot, of course, be chewed off by the animal.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. An animal muzzle constructed of thin, flat, flexible metal strips including a double layer collar band, a double layer nose band acutely angulated with respect to said collar band, a plurality of straps extending from said collar band to said nose band, each strap at its junctures with said collar band and nose band being welded between the layers of the bands, and a nose loop extending forwardly from said nose band, the nose loop at its junctures with the nose band being welded between the layers thereof, and means for opening and adjustably closing said collar band at the rear thereof, whereby the muzzle may be rearwardly opened and widened to facilitate application to an animal.

2. An animal muzzle as defined in claim 1, including two nose loops extending forwardly from said nose band, said nose loops being disposed at right angles with respect to each other and joined by welding at their point of intersection.

3. An animal muzzle as defined in claim 1, wherein the double layer collar band comprises a single length doubled on itself, and said means for opening and closing the collar is a buckle retained in the end loop of said collar band.

References Cited in the file of this patent

UNITED STATES PATENTS

| Number | Name | Date |
|---|---|---|
| 67,016 | Belmer et al. | July 23, 1867 |
| 868,145 | Swender | Oct. 15, 1907 |

FOREIGN PATENTS

| Number | Country | Date |
|---|---|---|
| 14,157 | Great Britain | 1895 |
| 17,259 | Great Britain | 1897 |
| 21,352 | Great Britain | 1897 |